(12) United States Patent
Pandharipande et al.

(10) Patent No.: US 9,967,952 B2
(45) Date of Patent: May 8, 2018

(54) DEMAND RESPONSE FOR NETWORKED DISTRIBUTED LIGHTING SYSTEMS

(71) Applicant: PHILIPS LIGHTING HOLDING B.V., Eindhoven (NL)

(72) Inventors: Ashish Vijay Pandharipande, Eindhoven (NL); Sri Andari Husen, Eindhoven (NL); David Ricardo Caicedo Fernandez, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days. days.

(21) Appl. No.: 15/318,128

(22) PCT Filed: Jun. 8, 2015

(86) PCT No.: PCT/EP2015/062653
§ 371 (c)(1),
(2) Date: Dec. 12, 2016

(87) PCT Pub. No.: WO2015/189118
PCT Pub. Date: Dec. 17, 2015

(65) Prior Publication Data
US 2017/0127496 A1 May 4, 2017

(30) Foreign Application Priority Data
Jun. 10, 2014 (EP) .................................... 14171819

(51) Int. Cl.
*H05B 37/02* (2006.01)
(52) U.S. Cl.
CPC ..... *H05B 37/0245* (2013.01); *H05B 37/0218* (2013.01); *H05B 37/0227* (2013.01); *Y02B 20/46* (2013.01)

(58) Field of Classification Search
CPC .... H05B 33/086; H05B 37/034; H05B 37/02; H05B 37/0218; H05B 37/0227;
(Continued)

(56) References Cited

U.S. PATENT DOCUMENTS 7,747,357 B2 * 6/2010 Murdoch .................. H02J 3/00
340/12.32
8,570,190 B2 * 10/2013 Marinakis .......... H05B 37/0272
340/915

(Continued)

FOREIGN PATENT DOCUMENTS

JP 2008204849 A 9/2008
WO 2012172453 A1 12/2012
(Continued)

*Primary Examiner* — Haissa Philogene
(74) *Attorney, Agent, or Firm* — Akarsh P. Belagodu

(57) ABSTRACT

The invention relates to a method for managing light settings of a luminaire communicatively connected to a local coordinator. The method, performed by the luminaire, includes steps of providing to the local coordinator a control state of the luminaire (e.g. occupancy status), receiving from the local coordinator a power reduction factor for the luminaire, the factor being based on the control state of the luminaire and on control states provided to the local coordinator by one or more additional luminaires, determining new illuminance settings for the luminaire by applying the received factor to current illuminance settings, measuring luminance within a sensing region of a light sensor of the luminaire while one or more light sources of the luminaire emit light according to one or more operating parameters, and, based on the measured luminance, adjusting the operating parameters to achieve the new illuminance settings.

15 Claims, 9 Drawing Sheets

(58) Field of Classification Search
CPC ............ H05B 37/0245; H05B 33/0842; G05B 2219/163; G05B 2219/25011; G05B 2219/2642; Y02B 20/46
USPC ............... 315/149, 152, 297, 307, 312, 362; 340/915, 924
See application file for complete search history.

(56) References Cited

U.S. PATENT DOCUMENTS

| | | | |
|---|---|---|---|
| 9,210,759 B2* | 12/2015 | Reed .................. | H05B 33/0854 |
| 9,497,832 B2* | 11/2016 | Verberkt ............ | H05B 37/0227 |
| 9,521,731 B2* | 12/2016 | Garcia Morchon ........... | H05B 37/0245 |
| 9,615,434 B2* | 4/2017 | Vangeel .................. | G06F 8/665 |
| 9,661,722 B2* | 5/2017 | Patel .................... | H05B 33/086 |
| 2010/0117620 A1* | 5/2010 | Veskovic .................. | H02J 3/14 323/318 |
| 2011/0031897 A1* | 2/2011 | Henig ................ | H05B 37/0254 315/297 |
| 2014/0139116 A1 | 5/2014 | Reed | |
| 2016/0336797 A1* | 11/2016 | Dahlen .............. | H05B 37/0245 |

FOREIGN PATENT DOCUMENTS

| | | |
|---|---|---|
| WO | 2013101779 A1 | 7/2013 |
| WO | 2014045138 A2 | 3/2014 |

\* cited by examiner

DEMAND RESPONSE FOR NETWORKED DISTRIBUTED LIGHTING SYSTEMS

CROSS-REFERENCE TO PRIOR APPLICATIONS

This application is the U.S. National Phase application under 35 U.S.C. § 371 of International Application No. PCT/EP2015/062653, filed on Jun. 8, 2015, which claims the benefit of European Patent Application No. 14171819.7, filed on Jun. 10, 2014. These applications are hereby incorporated by reference herein.

FIELD OF THE INVENTION

Embodiments of the present invention relate generally to the field of illumination systems, and, more specifically, to systems and methods for a luminaire communicatively connected to a local coordinator to manage light settings of the luminaire.

BACKGROUND OF THE INVENTION

Lighting systems, also referred to as "illumination systems", are known to consume a large proportion of energy in buildings and, more generally, in city infrastructures. A large part of lighting use comes in durations of high energy consumption. Lighting systems are attractive as controllable loads to enable dynamic load management because load reductions from lighting systems can be both predictable and substantial.

Lighting control systems are known where luminaires are dimmed using load-shedding ballasts by a certain amount over a duration of time. The load-shedding ballast enables the lighting system to provide cost-effective electrical demand response. U.S. Pat. No. 7,747,357 describes communication methods for transmitting and receiving load shedding messages. US patent application 2010/0117620 describes methods for automatically reducing power consumption based on load shedding requirements and set thresholds.

US2014/0139116 discloses a number of luminaires that can be communicatively coupled and networked. The luminaires may be equipped with sensors. A luminaire may autonomously adjust the luminous output responsive to an event sensed by a sensor at another luminaire in the network of luminaires.

One of the current trends in lighting systems is distributed control. In a distributed lighting control system, an intelligent luminaire has local occupancy and light sensing information and can adapt its dimming level based on either stand-alone control or in coordinated control based on exchanging limited control information with neighboring luminaires. Certain desired illumination constraints are thus met by granular adaptation of dimming levels to changing daylight and occupancy conditions. A common method for such lighting control is closed-loop feedback control. Herein, a certain set-point is specified at the light sensors in a calibration step that the controller needs to achieve. In real-time, the light sensor makes an illuminance measurement and the controller adapts the luminaire dimming level to achieve or be above the set-point. Given the distributed nature of such a lighting system, one problem relates to how dynamic load management is to be executed in such a system. Specifically, if a load shedding request comes to the building management system and is then translated to a load reduction at an area level, it would be desirable to set out how the individual luminaires should behave in order to meet the requested power reduction.

What is needed in the art is a technique for controlling lighting systems by which dynamic load management (e.g., demand response) services may be offered in a smart grid.

SUMMARY OF THE INVENTION

One object of the invention is to provide a method and system that allows dynamic adjustment of characteristics of artificial lighting sources to provide acceptable lighting conditions while reducing power consumption.

In one aspect of the invention, a computer-implemented method for managing light settings of a luminaire is disclosed. The luminaire is communicatively connected to a local coordinator, where, as used herein, the term "communicatively connected" refers to the ability of a first entity (e.g. the luminaire) to receive data from and/or transmit data to a second entity (e.g. the local coordinator), either by a wired or a wireless data connection.

The method includes steps of providing, from the luminaire to the local coordinator, a control state of the luminaire, and receiving, at the luminaire from the local coordinator, a power reduction factor ($\beta$) for the luminaire, the power reduction factor being based on the control state provided to the local coordinator by the luminaire and on control states provided to the local coordinator by one or more additional luminaires and, optionally, the power reduction factor received by the local coordinator from another system such as e.g. a building management system. The method also includes steps of determining new illuminance settings (e.g., the new set-point) for the luminaire by applying the received power reduction factor $\beta$ to current illuminance settings (e.g. to the current set-point) for the luminaire, measuring or providing an instruction for measuring luminance of mixed light within a sensing region of a light sensor of the luminaire while one or more light sources of the luminaire emit light according to one or more operating parameters, wherein the mixed light comprises contribution from the light emitted by the one or more light sources of the luminaire and, possibly, contribution from light emitted by light sources other than the one or more light sources of the luminaire, and based on the measured luminance, adjusting the one or more operating parameters to achieve the new illuminance settings.

As used herein, the term "control state" of a luminaire is used to describe the state in which one or more parameters that define the control of the luminaire are in. Some examples of a control state of a luminaire include, but are not limited to, an occupancy status of a luminaire and a steady-state dimming level of a luminaire. For e.g., the occupancy state of the luminaire may refer to a luminaire-occupied state, an area-occupied state, and an unoccupied state.

Embodiments of the present invention are based on recognition that it is possible to take advantage of the centralized overview available to a local coordinator by allowing the local coordinator to calculate the power reduction factor for each luminaire, while shifting the intelligence required for determining the appropriate operating parameters in order to achieve that power reduction to the luminaires themselves. The local coordinator has the centralized overview because each of the luminaires under its coordination measures and provides the control state, e.g. occupancy status, of the luminaire. The local coordinator may then calculate a power reduction factor $\beta$ for each of the luminaires based on the control states provided by all luminaires under its coordination. Each luminaire then determines the new illuminance settings by applying the factor β to the previous illuminance settings, measures the actual luminance associated with the luminaire, and adjusts the operating parameters of its light source based on the measured luminance so that the new illuminance settings are achieved. By virtue of the fact that the operating parameters are adjusted so that the new illuminance settings, which depends on factor β, are achieved, the new operating parameters depend on the control state of the luminaire as well as that of other luminaires under the coordination of the local coordinator. Because the operating parameters are adjusted based on the measured luminance, the new operating parameters also depend on the light sensor measurements of the luminaire and can account for the light contribution provided by light sources other than the luminaire in question. Such implementation advantageously allows power reduction while the local coordinator may remain ignorant of e.g. the different types of light sources which may be available at different luminaires and of the different local light conditions at those luminaires. In addition, by adjusting the illuminance settings, independent of the type of closed loop control algorithm at each luminaire, the power reduction may be still achieved.

Embodiments of the present invention further allow for a distributed lighting control system in which control functions are distributed in the luminaires. The luminaires operate based on own sensing inputs as well as the control states of other luminaires to achieve a certain illumination target within a certain area. Such a distributed lighting control system is able to achieve a power reduction target by means of the luminaires adjusting their illumination settings which results in lower power consumption while allowing the luminaire controllers to continue operating in a distributed manner. As the local coordinator has the overview of the states of the luminaires within its coordination, for each luminaire, it can calculate a power reduction factor taking into account the states of the luminaires and other luminaires within the local coordination, such that power reduction behavior of each luminaire can be based on the states. Such implementation allows for less important state luminaires to have a larger power reduction factor than more important state luminaires while the overall power reduction can still be achieved.

In an embodiment, the method may further include providing, from the luminaire to the local coordinator, the one or more operating parameters associated with the (state-dependent) current illuminance settings for the luminaire, where the power reduction factor β is further based on the one or more operating parameters provided to the local coordinator by the luminaire and on one or more operating parameters provided to the local coordinator by the one or more additional luminaires. The one or more operating parameters for each of the luminaires allow the local coordinator to estimate power consumption by each of the luminaires. The one or more operating parameters are, preferably, state-dependent parameters, allowing the local coordinator to estimate power consumption by each of the luminaires in its current state and hence enabling the local coordinator to make a state-dependent adjustment to the power reduction factor.

In an embodiment, the one or more operating parameters may advantageously include a dimming level, a color temperature, and/or an illumination profile for the one or more light sources of the luminaire.

In an embodiment, the control state may comprise an occupancy status or may be based on an occupancy status sensed by an occupancy sensor. In one further embodiment, the occupancy status of the luminaire may be one of a plurality of predefined states, such as e.g. a luminaire-occupied state, an area-occupied state, and an unoccupied state. Such an embodiment may provide the advantage that e.g. by knowing the occupancy status, the local coordinator may directly determine the power consumption of a luminaire, if the operating parameters that determine the power consumption are predefined for the different occupancy status. Knowing the occupancy status of all the luminaires within its coordination further allows the local coordinator to adjust the power reduction factor based on the occupancy status of each of the luminaire in its coordination. A potential usage is to reduce in greater proportion the power consumption of luminaires in area-occupied state, as the illumination in that state is for the comfort purpose rather than for task purpose (comfort purpose is less important than task purpose).

In an embodiment, the illuminance settings may comprise a target value for illuminance (target set-point). This embodiment provides the advantage of easy implementation and control of the light output of a luminaire. In a further embodiment, the illuminance settings further comprise target values for one or more of color rendering index, correlated color temperature, color quality scale (CQS), Gamut Area Index (GAI), Gamut Area Scale (GAS), Color Harmony Rendering Index (HRI), and Delta-uv (Duv). Such an embodiment provides the advantage of a further fine-tuning of the light output of the luminaire.

In an embodiment, the method may further include providing the adjusted operating parameters to the local coordinator. In this manner, the local coordinator may determine the new power consumption of a luminaire and, possibly, repeat the process of calculating and providing the power reduction factor to the luminaires in order to achieve a target power reduction for all of the luminaires under the coordination of the local coordinator.

In another aspect of the invention, a luminaire controller is disclosed. The luminaire controller comprises one or more receivers configured for receiving the control state (e.g. receiving an occupancy status of the luminaire from an occupancy sensor of the luminaire), the measured luminance from a light sensor of the luminaire, and the power reduction factor β from the local coordinator. The luminaire further comprises a transmitter configured for providing the control state of the luminaire to the local coordinator and a processing unit configured for performing the steps of the methods described herein.

A luminaire and a system comprising a plurality of such luminaires are also disclosed. The luminaire includes one or more light sources configured for emitting light according to one or more operating parameters, an occupancy sensor configured for determining an occupancy status of the luminaire, a light sensor configured for measuring luminance, a transmitter configured for providing the control state of the luminaire to the local coordinator, a receiver configured for receiving the power reduction factor from the local coordinator, and a processing unit configured for performing the steps of the method as described herein by being performed by the luminaire. The system further includes a local coordinator communicatively connected to the plurality of the luminaires and configured for receiving the control state from each luminaire of the plurality of luminaires, determining a power reduction factor β for each of the luminaires, the power reduction factor for each of the luminaires being based on the control states received from all of the luminaires and, possibly, the operating parameters and a power reduction factor (α) the local coordinator received from an external system, and providing the determined power reduction factor to each respective luminaire.

Moreover, a computer program (product) for carrying out the methods described herein, as well as a computer readable storage-medium (CRM) storing the computer program are provided. A computer program may, for example, be downloaded (updated) to the existing luminaire controllers to configure them to perform the methods described herein, or be stored upon manufacturing of these devices. Preferably, the CRM comprises a non-transitory CRM.

Hereinafter, embodiments of the invention will be described in further detail. It should be appreciated, however, that these embodiments may not be construed as limiting the scope of protection for the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

It is to be understood that the figures and descriptions of the present invention described herein have been simplified to illustrate the elements that are relevant for a clear understanding of the present invention, while eliminating, for purposes of clarity many other elements. However, because these elements are well-known in the art, and because they do not facilitate a better understanding of the present invention, a discussion of such element is not provided herein. The disclosure herein is directed to also variations and modifications known to those skilled in the art.

Figure 1:
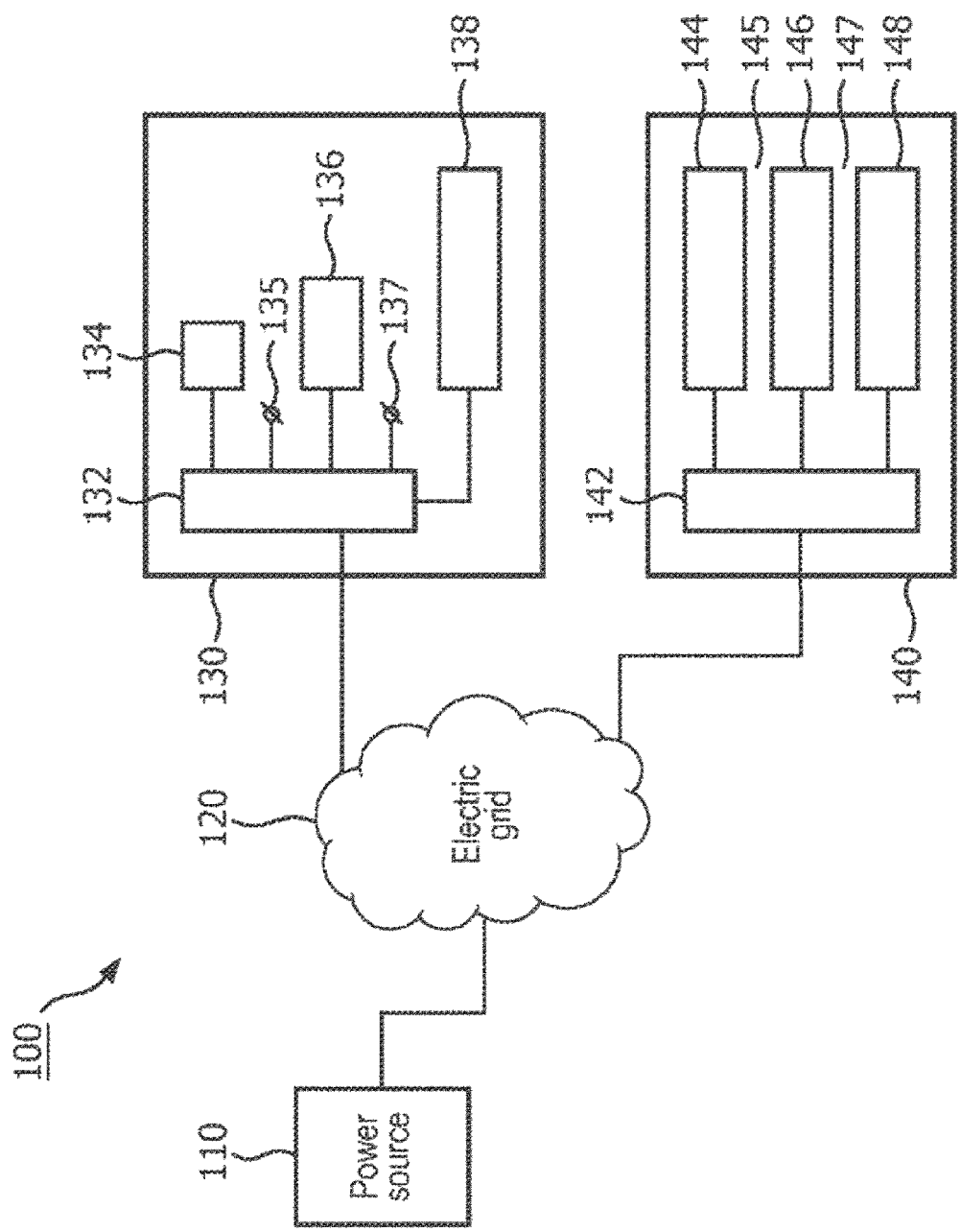
FIG. 1 represents an exemplary electrical network which may power one or more illumination systems.

FIG. 1 represents an exemplary electrical network 100 comprising a power source 110, an electrical grid 120 receiving power from the power source 110 and providing the power to a plurality of load devices within corresponding area 130, 140. Power source 110 may be one or more of a coal-fired electrical generation plant, a nuclear electrical generation plant, a hydro-electrical generation plant or any other conventional electrical generation plant. In addition, power source 110 may be a renewal energy generation plant. For example, wind, solar, biofuel, etc.

The areas or environments 130, 140, may represent office buildings, shopping malls, homes, garages, parking lots, tunnels, and other similar areas that require electrical power for the luminaires of one or more illumination systems to provide illumination in one or more areas. For example, area 130 depicts different enclosed areas 134, 136, 138 and two open areas 135, 137. Power is provided to each of these areas via a power distribution system 132. Area 140, similarly, illustrates three enclosed areas 144, 146, 148 and two open areas 145, 147, which receive power from power distribution system 142. As would be appreciated, areas 130, 140 and the number of enclosed and open areas within each of these areas 130, 140 is only to illustrate the principles of the present invention and the number of areas and enclosed and open areas within each area 130, 140 may be changed without altering the scope of the invention claimed.

Figure 2:
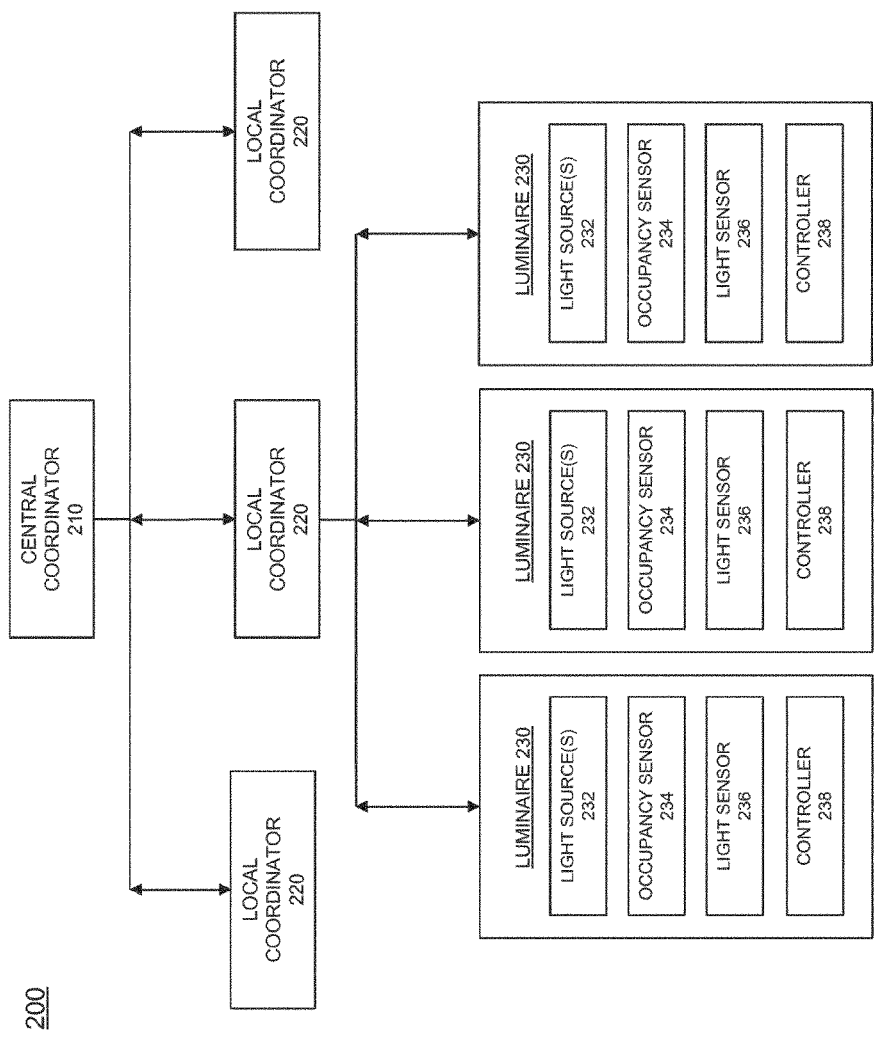
FIG. 2 is a schematic illustration of an exemplary light management system, according to one embodiment of the present invention.

FIG. 2 is a schematic illustration of an exemplary light management infrastructure 200, according to one embodiment of the present invention. The infrastructure 200 is suitable for managing light, in particular, power consumption by the luminaires of an illumination system in an area such as e.g. the area 134. Such an area would typically include multiple luminaires and could also include a window that provides for entry of natural light into the area. Of course, it would be recognized that the principles of the light management infrastructure 200 depicted in FIG. 2 would also be applicable to other areas or environments where multiple luminaires are to be managed.

The light management infrastructure 200 may be viewed as a three-tier system. In the first tier, the infrastructure 200 includes a central coordinator 210 that resides e.g. in a building management system (BMS) of a particular building. In the second tier, there are one or more local coordinators 220, in the exemplary illustration of FIG. 2 shown as three local coordinators 220, communicatively connected to the central coordinator 210 via a bi-directional communication link so that each of the local coordinators 220 can exchange data with the central coordinator 210. In the third tier, there are one or more luminaires 230 under the coordination of each of the local coordinators 220. In the exemplary illustration of FIG. 2, three luminaires 230 are shown to be under coordination of the local coordinator 220 depicted in the center of the figure. As shown in FIG. 2, each of the one or more luminaires under the coordination of a particular local coordinator are communicatively connected to that local coordinator via a bi-directional communication link so that each of the luminaires can exchange data with their respective local coordinator. In this manner, the local coordinators 220 act as coordinators for a particular group of the luminaires of the entire illumination system. For example, each area (e.g. a room) in a building could include one local coordinator 220 that is assigned to coordinate the luminaires 230 within that area. The plurality of the luminaires 230 which may be assigned to the different local coordinators 220, together, form an illumination system, the light of which is to be managed as described herein. The central coordinator 210 and the local coordinators 220 form a light management system for managing energy consumption of the illumination system of the luminaires 230. In an embodiment, the local controllers 238 of the luminaires 230 could also be considered as a part of the light management system.

The communication links (i.e., the data exchange paths, either wired or wireless) between various respective entities are illustrated in FIG. 2 with arrows. Even though not shown in FIG. 2, the infrastructure 200 could include further central coordinators 210, connected to further one or more local coordinators 220, which are in turn connected to one or more luminaires 230.

According to the embodiments of the present invention, each of the luminaires 230 is a smart luminaire in a sense that it is equipped with sensors and a controller capable of autonomously analyzing data and adjusting the operation of the luminaire as described herein. In particular, as shown in FIG. 2, each of the luminaires 230 includes one or more light sources 232 (referred to hereafter as a singular "light source 232"), an occupancy sensor 234, a light sensor 236, and a luminaire controller 238. An exemplary luminaire 230 is now described in greater detail.

The light source 232 could comprise any combination of any suitable sources of light such as e.g. high/low pressure gas discharge sources, laser diodes, inorganic/organic light emitting diodes, incandescent sources, or halogen sources. During operation, the light output provided by the light source 232 contributes to the total illumination provided by the illumination system for illuminating at least parts of an area.

The occupancy sensor 234 is positioned in such a way as to determine occupancy within a particular area associated with the luminaire 230, typically the area that the luminaire 230 is intended to illuminate. A variety of occupancy sensors are available in the market that can detect whether a space is occupied or unoccupied, and possibly detect the number and the nature of the occupants, using Infra-Red, Ultrasound and/or Microwave technology. Any of these sensors could be used as the occupancy sensor 234. The occupancy sensor 234 could include a motion detection sensor.

In an embodiment, the luminaire 230 may operate in one of a number of predefined control states based on the occupancy status from the luminaire. For example, there could be two states defined where the luminaire 230 can operate in either an occupied mode or in an unoccupied mode. Whether a space (e.g., the area 134) is occupied or unoccupied is decided based on the input(s) from associated occupancy/motion sensor(s) (or other types of sensors) that monitor the space. In an occupied state, a higher color rendering index (CRI) value may be desirable for occupant comfort and visual acuity. Similarly, in surveillance applications, when motion is detected, a higher CRI value is preferred for a better picture quality. Hence, in an embodiment, in an occupied state, the light source 232 of the luminaire 230 may be driven to maximize the luminous efficacy while maintaining the CRI above a threshold (target value), denoted by H. On the other hand when the occupancy sensor 234 detects that the space is vacated (unoccupied), i.e. in an unoccuppied state, the light source 232 may be driven to maximize the luminous efficacy while maintaining the CRI above another threshold, denoted by L. In this embodiment of the invention, 0<L<H<100. Additional efficacy gains achievable due to change in the CRI threshold from a high value H to a low value L is proportional to the absolute difference between H and L. Large difference leads to higher energy savings and vice versa.

In the embodiment described above, the controller 238 of the luminaire 230 may establish in which one of the two states the luminaire 230 is to operate, based on the occupancy information received by the controller 238 from the occupancy sensor 234. Thus, the luminaire 230 may take the decision as to in which state it is to be operated autonomously. In other embodiments, the luminaire decides on its state based on its own occupancy status as well as other luminaire status within the same neighborhood or under the coordination of the same local coordinator. For example, in an embodiment, three occupancy states may be defined for a luminaire: (1) luminaire-occupied, where the occupancy sensor 234 of the luminaire 230 detects local occupancy of a certain area directly associated with the luminaire; (2) area-occupied, where the occupancy sensor 234 does not detect local occupancy, but at least one luminaire in the local neighborhood is in luminaire-occupied state; and (3) unoccupied, when none of the luminaires in the local neighborhood is in luminaire-occupied state. In such an embodiment, the target illuminance level at the workspace of luminaire-occupied state luminaire would typically be higher (e.g. 500 lux) than the target illuminance level at the workspace of area-occupied state luminaire (e.g. 300 lux). The luminaire in an unoccupied state could typically be turned off.

The light sensor 236 is positioned in such a way as to measure at least a portion of the light emitted by the light source 232 of the luminaire. To that end, the field of view of the light sensor 236 at least partially overlaps with the illumination footprint of the light produced by the light source 232. In a typical embodiment, where the luminaire 230 is a lamp installed on a ceiling and configured to illuminate the surface below it, the light sensor 236 may be installed within or near the luminaire 230 so that, during operation, the light sensor 236 faces downwards, where its field of view would overlap with the area illuminated by the light source 232, and measures light reflected from the surface below the luminaire 230. For example, the light sensor 236 could be built into the luminaire 230 by facing, during operation, downwards in a black tube, only open at the bottom and protruding beneath the luminaire. In other embodiments, the light sensor 236 can be configured to measure the light emitted by the light source 232 and directly incident on the light sensor 236, as opposed to measuring the reflected light.

If light sources other than the light source 232 are present and their light contribution is within the field of view of the light sensor 236, then the light sensor 236 detects the illuminance of such a mixed light. For example, natural light (e.g. from the sun or the moon) may enters an area (or space or zone) and be present within the field of view of the light sensor 236. In addition, light contribution from other artificial sources besides the light sources 232 of this particular luminaire, such as e.g. the light sources of the neighboring luminaires, may be present within the field of view of the light sensor 236. Thus, the ambient (mixed) light as detected and measured by the light sensor 236 while the light source 232 emits light of non-zero intensity may comprise not only the contribution from the light emitted by the light source 232 but also a contribution from other light sources, both natural and artificial. As described in greater detail below, an output of the light sensor 236 is then provided to the controller 238, that can determine a desired level of illuminance (and other additional characteristics) of the light source 232, based on a target set point. In an embodiment, the initial target set point may be determined based on criteria, such as occupancy, time of day, user input etc.

While the occupancy sensor 234 and the light sensor 236 are described herein and illustrated in FIG. 2 as included within a luminaire 230, in other embodiments, either one or both of these components may be external to the luminaire 230 and implemented as separate units. In such other embodiments, the occupancy sensor 234 and/or the light sensor 236 could be installed near the luminaire 230 so that they can carry out their respective sensing as described above.

The luminaire controller 238 is an intelligent controller capable of communicating with the local coordinator 220 as well as reading and processing the measurements of the light sensor 236 and providing instructions to the light source 232 for emitting light to achieve a target set point, e.g. to emit light at a particular luminous flux level. To that end, the controller 238 may be implemented as a data processing system 300 illustrated in FIG. 3 and described below.

Figure 3:
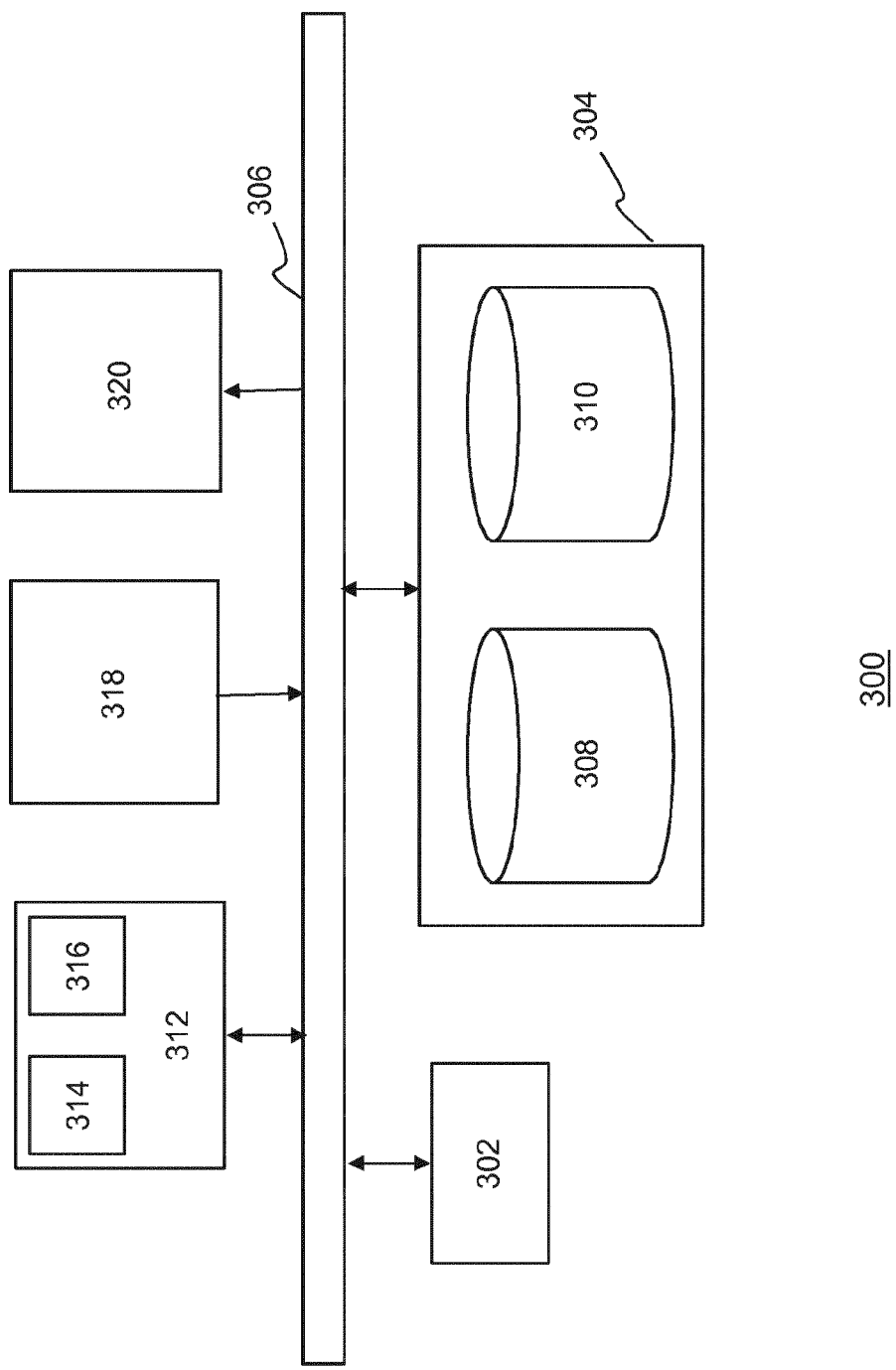
FIG. 3 is a schematic illustration of a data processing system for carrying out light management methods described herein, according to one embodiment of the present invention.

FIG. 3 is a schematic illustration of a data processing system 300 for carrying out light management methods described herein, according to one embodiment of the present invention. As shown in FIG. 3, the data processing system 300 may comprise at least one or more processors 302 (hereafter, a "processor 302") and memory elements 304, coupled to the one or more processors 302 through a system bus 306. As such, the data processing system 300 may store program code within the memory elements 304. Further, the processor 302 may execute the program code accessed from memory elements 304 via the system bus 306. In one aspect, the data processing system 300 may be implemented as a computer that is suitable for storing and/or executing program code. It should be appreciated, however, that the data processing system 300 may be implemented in the form of any system including a processor and memory that is capable of performing the functions described within this specification.

The memory elements 304 may include one or more physical memory devices such as, for example, local memory 308 and one or more bulk storage devices 310. The local memory 308 may refer to random access memory or other non-persistent memory device(s) generally used during actual execution of the program code. The bulk storage devices 310 may be implemented as a hard drive or other persistent data storage device. The data processing system 300 may also include one or more cache memories (not shown) that provide temporary storage of at least some program code in order to reduce the number of times program code must be retrieved from bulk storage device during execution.

The memory elements 304 may store an application (not shown). It should be appreciated that the data processing system 300 may further execute an operating system (not shown) that can facilitate execution of the application. Application, being implemented in the form of executable program code, can be executed by the data processing system 300, e.g., by the processor 302. Responsive to executing application, the data processing system 300 may be configured to perform one or more method steps to be described herein in further detail.

A network adapter 312 may also be coupled to the data processing system 300 to enable it to become coupled to other systems, computer systems, remote network devices, and/or remote storage devices through intervening private or public networks. The network adapter may, in particular, comprise a data receiver 314 for receiving data that is transmitted by said systems, devices and/or networks to said data and a data transmitter 316 for transmitting data to said systems, devices and/or networks. Modems, cable modems, Ethernet cards, and wireless adapters are examples of different types of network adapter that may be used with the data processing system 300.

Optionally, one or more input devices 318 and/or output devices 320 may be included within or coupled to the data processing system 300. The input devices 318 could comprise peripheral input devices, such as e.g. a keyboard, a pointing device such as a mouse, or the like. The output devices 320 could comprise a monitor or display for displaying data to a user, preferably via a dedicated user interface. The display 320 may comprise a touch screen display, also sometimes referred to as a "touchscreen display" or "touch-sensitive display", configured to detect and respond to contact on or near the screen. Such a display may also be considered to be an input device because it allows a user to provide user input to the data processing system 300 by making movements with a physical object such as e.g. a finger of the user or a stylus, on or near the touch screen display. Other examples of output devices which could, optionally, be also coupled to the data processing system 300 include e.g. speakers, or the like. Input devices and/or output devices may be coupled to the data processing system 300 either directly or through intervening I/O controllers (not shown in FIG. 3).

In various embodiments, the data processing system 300 could represent the luminaire controller 238 or the local coordinator 220. In an embodiment where the data processing system 300 is the luminaire controller 238, the receiver 314 could be a receiver for receiving data from the local coordinator 220, the transmitter 316 could be a transmitter for transmitting data to the local coordinator 220, and the processing unit 302 could be configured for carrying out the method steps described herein for controlling the operation of the luminaire 230, in particular for controlling the operation of the light source 232 by e.g. switching it between different luminous flux levels. When the light source 232 comprises one or more LEDs, the luminaire controller 238 may further include a driver component (e.g., a conventional LED ballast) capable of turning the LED(s) on or off as necessary and of adjusting the luminous flux of the light produced by the LED(s) by adjusting e.g. the drive current applied to the LED(s) and/or adjusting the timing of the on/off cycle.

Figure 4:
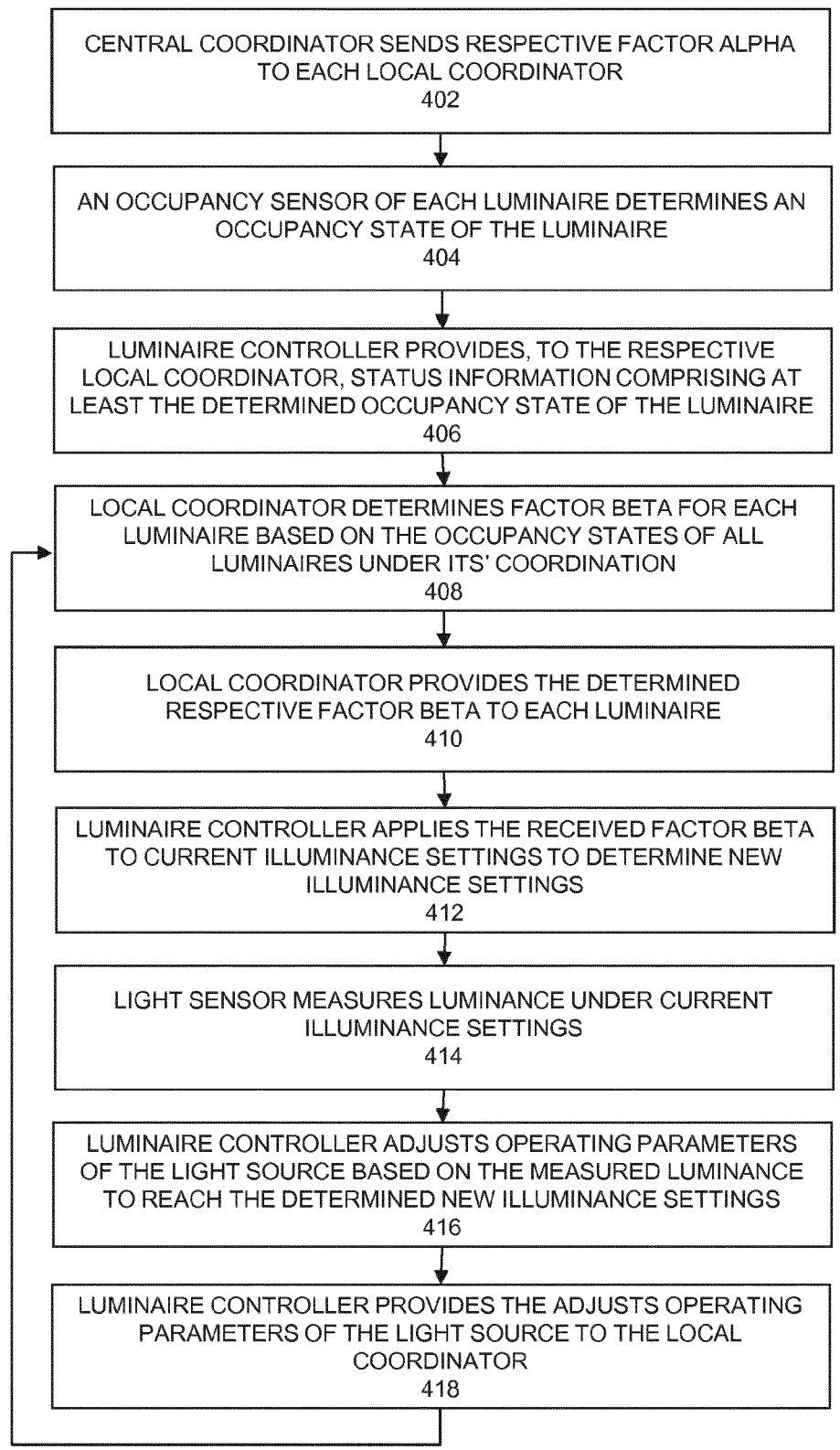
FIG. 4 is a flow diagram of method steps for adjusting operating parameters of a luminaire to accommodate for requested energy reduction within the illumination system, according to one embodiment of the present invention.

The light management infrastructure 200 may operate as shown in FIG. 4.

FIG. 4 is a flow diagram of method steps for adjusting operating parameters of a luminaire 230 to accommodate for requested energy reduction within the illumination system, according to one embodiment of the present invention. While the method steps are described in conjunction with the elements shown in FIGS. 2 and 3, persons skilled in the art will recognize that any system configured to perform the method steps, in any order, is within the scope of the present invention.

There is a particular target illuminance settings for each luminaire 230, defined at the luminaire controller 238 of that luminaire, which determines the light output that the respective light source 232 of the luminaire needs to provide to the illuminated space. For example, in one embodiment, the illuminance settings may be expressed as a set-point, which defines a particular light sensor reading to be achieved through adjusting the light output of the light source 232. The light sensor 236 measures luminance to determine whether or not the light source 232 complies with the target set-point. The target set-point may be determined e.g. in a dark-room calibration step, i.e. in absence of daylight, by turning all luminaires to a pre-determined dimming level, which corresponds to a desired target illuminance level at the working plane (e.g. at desk height). For example, the set-point of a particular luminaire could be 500 lux.

In other embodiments, illuminance settings for each luminaire could be more extensive, comprising a number of different values or characteristics that define what the light output of a light source should be. For example, illuminance settings could comprise target values for one or more of dimming level, color rendering index, correlated color temperature, color quality scale, Gamut Area Index, Gamut Area Scale, Color Harmony Rendering Index, and Delta-UV. In such embodiments, the light sensor needs to be able to sense the physical property associated with those settings.

Different target illuminance settings may be defined, e.g. based on the state of the occupancy sensor 234 of the luminaire and other luminaires in its neighborhood. For example, in an embodiment, three occupancy states may be defined: a luminaire-occupied state, an area-occupied state, and an unoccupied state, as described above. In this manner, the system may predefine the illuminance settings, which in turn, determine the operating parameters of the light source, for different occupancy states of a luminaire. In an embodiment, the predefined illuminance settings for each of the occupancy states may be stored not only within each luminaire (e.g. within the memory of the luminaire controller) but also within the local coordinator associated with that luminaire.

When there is a need to reduce energy consumption of the illumination system, in step 402 shown in FIG. 4, the central coordinator 210 sends a command to that effect to the local coordinators 220, the command containing a factor α, which is a number between 0 and 1, which indicates by how much the total energy consumption of the luminaires under the coordination of those local coordinators needs to be reduced. For example, a particular local coordinator 220 receiving from the central coordinator 210 a factor α equal to 0.8 indicates to that local coordinator that the total energy consumption of the luminaires under the coordination of that local coordinator needs to be reduced by 20% of the current energy consumption. The value of α could be different for different local coordinators in order to achieve reduction in the total energy consumption of all of the light sources within the system by a particular factor.

The following steps in FIG. 4 illustrate operation of an exemplary particular local coordinator that receives a particular value α. The other local coordinators of the light management system operate in the same manner.

The local coordinator for a particular group of luminaires has the benefit of having the overview of current status information for all of the luminaires in the group. The current status information for each of these luminaires includes at least the control states, e.g. occupancy status (e.g. luminaire occupied, area occupied, unoccupied), for each luminaire, indicating whether or not there are any occupants present within the illumination footprint of the luminaire and other luminaires in its neighborhood, possibly, how many occupants there actually are. The local coordinator has this information because each of the luminaires determines this information using e.g. the occupancy sensor 234, shown in FIG. 4 with step 404, and provides this information to the local coordinator, shown in FIG. 4 with step 406. In various embodiments, steps 404 and 406 may take place at different times and not necessarily after the step 402 has occurred. For example, in some embodiments, the occupancy sensor 234 may be configured to determine the occupancy status of the luminaire and provide the state to the luminaire controller 238 periodically or at some specific predefined times. In another embodiment, the occupancy sensor 234 may be configured to determine the occupancy status of the luminaire only when instructed to do so, e.g. by the luminaire controller 238, where the luminaire controller 238 could be configured to instruct the occupancy sensor 234 to determine occupancy status when it receives factor α from the central coordinator 210. Similarly, in different embodiments, the luminaire controller 238 may be configured to provide the determined occupancy status information to the local coordinator at different times—e.g. either every time after receiving this information from the occupancy sensor 234 or only when there is a change as compared with the previously received occupancy status.

In addition to having the overview of the control states for the luminaires under its' coordination, the local coordinator has the overview of the luminaire controller settings for all the control states containing the current operating parameters of the luminaires such as the dimming level, color temperature, illumination profile, etc. In one embodiment, the local coordinator is able to have this overview because the luminaires communicate information indicative of their current operating parameters to the local coordinator, i.e. this information forms part of the status information provided by each luminaire to its respective local coordinator. In other embodiments, suitable e.g. for the state dependent settings that don't change, this information can be programmed in the local coordinator, e.g. during commissioning of the system.

The overview of the information indicative of the current operating parameters of a particular luminaire gives the local coordinator information regarding how much energy the luminaire is consuming at the moment, because the operating parameter settings of the luminaire affect energy consumption. The overview of the control states for all of the luminaires allows the local coordinator to decide whether or not, and to what extent, the energy consumption of each particular luminaire is necessary and/or justified. In particular, the local coordinator calculates, in step 408, for each of the luminaires under its coordination, a factor β indicative of how much power consumption of each luminaire should be adjusted. The local coordinator determines the factor β for each luminaire based on the luminaire's current control state as well as the control states of other luminaires under the coordination of that local coordinator. For example, if an occupancy status of a particular luminaire indicates that the area associated with the luminaire is unoccupied, but the areas associated with the neighboring luminaires are occupied, the local coordinator may determine factor β for the first luminaire that is lower than e.g. the value for neighboring luminaires that are occupied.

In step 410, the local coordinator communicates to each luminaire, in particular to the luminaire controller 238 of each luminaire, the factor β that it determined for this luminaire.

The following steps in FIG. 4 relate to how a particular luminaire that received a particular value of β from the local coordinator operates. As shown in step 412, the luminaire controller 238 applies the received value of β to the current illuminance settings to determine new illuminance settings. For the simple example where the illuminance settings comprise a set-point, the luminaire controller 238 applies factor β to the current set-point, e.g. by multiplying the current set-point by value β. For example, if the current set-point of the luminaire is 500 lux (i.e., the current target illuminance value is 500 lux) and the received β value for that luminaire is 0.9, it means that the luminaire controller will calculate the new set point to be 450 lux (500 lux multiplied by 0.9).

In step 414, which may occur at any time prior to step 416, the light sensor 236 of the luminaire measures and provides to the luminaire controller 238 the actual, measured, value(s) of illuminance when the light source 232 emits light under the current illuminance settings. The measured luminance is the illuminance value of the mixed light, where the mixed light includes light contribution of the light source of that luminaire as well as light contribution of other light sources, either artificial or natural, which may be present at the moment. The luminaire controller may then determine which ones of the current operating parameters of the luminaire need to be adjusted and by how much in order to achieve the new illuminance settings that the luminaire controller determined based on β in step 412. In step 416, the luminaire controller adjusts the current operating parameters accordingly. Methods for adjusting operating parameters of a light source to achieve a desired illuminance settings in view of light sensor measurements of the actual, mixed, light present at the moment are known in the art and, therefore, are not described here.

In an area which includes both light from at least one electrical (i.e., artificial) luminaire and light from other sources, it is known that the intensity of the light emitted by the artificial luminaire may be reduced as the intensity of the light from other sources increases. As an example of the processing of the present invention, at first, the set point at a particular reference location (e.g., area 134) could be 500 lux and the light source of the luminaire operates according to a particular dimming level (i.e., a particular operating parameter) to achieve the 500 lux illumination. After factor β of 0.9 is applied, the new set point becomes 450 lux. To maintain illuminance of 450 lux, the light source of the luminaire 230 is dimmed (i.e., the dimming level is adjusted) while taking into account illuminance provided by other light sources, e.g. in proportion to the increase in daylight illuminance. Thus, the operating parameters for the light source may be adjusted as illuminance contributed by the luminaire with respect to the illuminance contributed by the other light sources changes.

It should be noted that luminous efficacy and Color Rendering Index (CRI) are two key performance metrics of luminaires. Luminous efficacy of a source is a measure of how efficiently a luminaire produces visible light. It is the ratio of total luminous flux emitted and input electric power. Luminous efficacy is typically expressed in lumens per Watt (lm/W) in SI units.

CRI is the measure of a luminaire's ability to render the true colors of physical objects in comparison with an ideal or natural luminaire. The color rendering performance of a source is determined by its spectral power distribution. A broad emission spectrum distributed throughout the visible region generally results in high CRIs. A predefined form of natural light and a black body radiator have a CRI value of 100. For general illumination purposes CRI values in the 70s are considered 'acceptable', and values greater than 80 are considered as 'good'. Higher CRI luminaires may be desirable in studios, museums, art galleries and exhibition halls whereas high luminous efficacy sources are desirable in street lighting applications.

Luminous efficacy and color rendering are determined solely by the spectrum of the source. A fundamental trade-off exists between the luminous efficacy and CRI. In other words, improvements in luminous efficacy come at the expense of CRI and vice versa. Modern luminaires, such as LEDs, enable dynamic tuning of CRIs.

Thus, in accordance with the principles of the invention it may be desired to maintain the CRI of a combination of daylight and artificial light (i.e., mixed-light) at a desired target level while dynamically adjusting the CRI of electric luminaire in response to variation in daylight. Since the CRI of the daylight is close to 100, if the contribution of daylight in the mixed light increases then the CRI of artificial luminaire can be reduced while maintaining the CRI of the mixed light above a desired, target, or predetermined level. For example, during night when daylight is absent, the CRI of the artificial luminaire can be set to a desired value (e.g., 85) to maintain a quality lighting environment. On the other hand, when the contribution of daylight and artificial light are equal (e.g. 50% each) in a mixed visible light environment, then the CRI of the artificial light can be set to a lower value (e.g., 70) while attaining an overall desired CRI for the mixed light. That is, a lower CRI of 70 with 50% contribution and a daylight CRI of 100 with 50% contribution results in a total CRI of 85 (i.e., 70*0.5+100*0.5=85). In this case significant energy savings can be attained while maintaining the quality of mixed light.

In an optional step 418, the luminaire controller 238 may provide information indicative of the adjusted operating parameters to the local coordinator 220. Having received such information from all luminaires under its coordination, the local coordinator 220 may then determine whether the required energy reduction as specified by factor α has been achieved. Steps 408-418 may be performed iteratively, as indicated in FIG. 4 with an arrow from step 418 to step 408, until the target energy reduction specified by factor α has been achieved for the group of luminaires under the coordination of a particular local coordinator. In this manner, energy consumption may be reduced in increments and the luminaires 230 and the central coordinator 210 form a closed-loop control system.

In an embodiment, the luminaire controller 238 may be configured to provide an indication to the local coordinator if the light source 232 has reached saturation, e.g. if the dimming level of the light source is at the minimum permissible level and the luminaire can no longer engage in power reduction.

Figure 5:
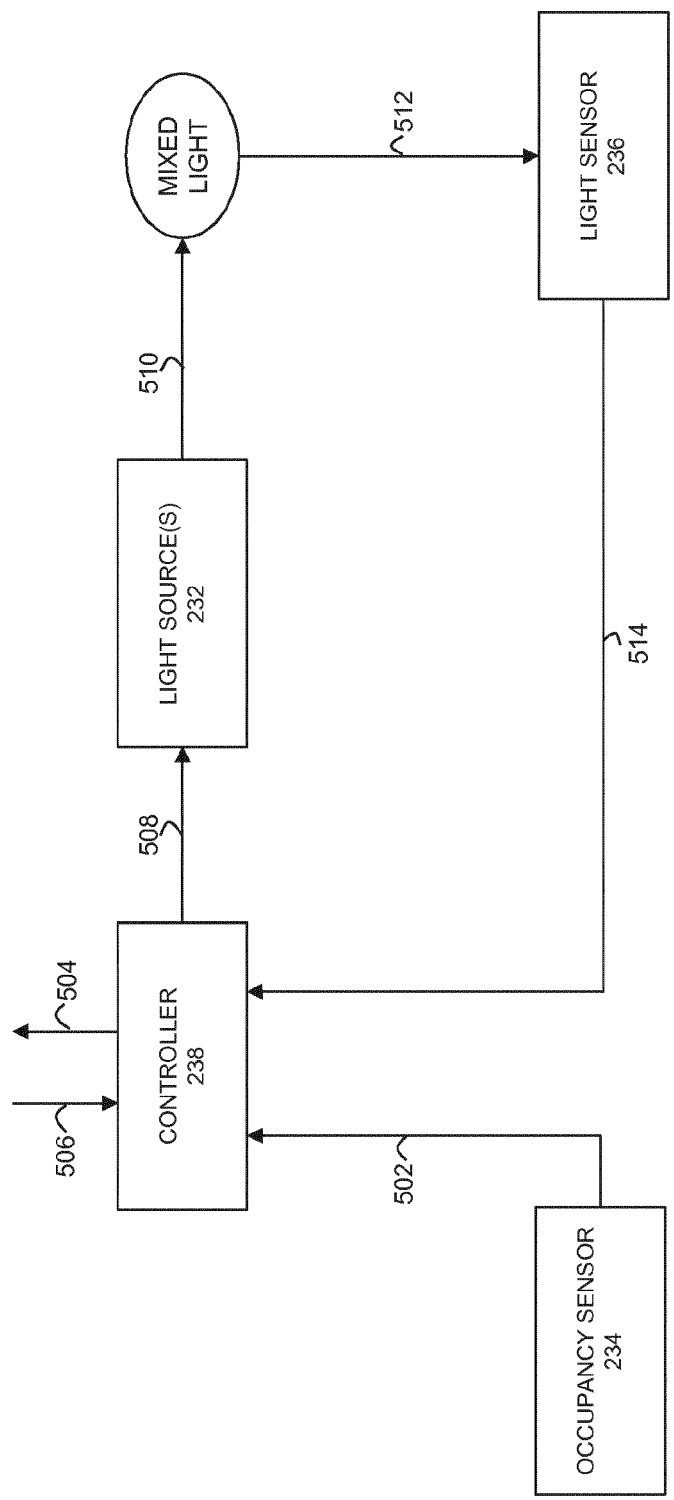
FIG. 5 illustrates a closed-loop method for a luminaire controller of a luminaire to determine new operating parameters for a light source of the luminaire, according to one embodiment of the invention.

FIG. 5 illustrates a closed-loop method for the luminaire controller to determine new operating parameters for the light source, according to one embodiment of the invention. As shown in FIG. 5 with an arrow 502, the occupancy sensor 234 of the luminaire determines occupancy status and provides it to the luminaire controller 238 (step 404 described above), which, in turn, provides the occupancy status to the local coordinator, as indicated with an arrow 504 (step 406 described above). The local coordinator calculates factor β for the luminaire (step 408 described above) and provides it to the luminaire controller 238 as shown in FIG. 5 with an arrow 506 (step 410 described above). The luminaire controller then seeks to determine the appropriate new operating parameters, e.g. the dimming level for the light source, by a closed-loop control method shown with arrows 508-514. To that end, the luminaire controller 238 provides operating parameters to the light source 232 (shown with an arrow 508), which emits light according to these operating parameters as shown with an arrow 510, resulting in a mixed light comprising at least a portion of the light emitted by the light source 232 and, if present, light contribution from other light sources, either natural (the sun or the moon) or artificial (other light sources in the surrounding), shown with an oval "Mixed light" in FIG. 5, which mixed light is incident on the light sensor of the luminaire, as shown with an arrow 512. The light sensor measures the light impinging thereon and provides the results of the measurement to the luminaire controller 238, as shown with an arrow 514. The luminaire controller then determines whether the operating parameters need to be adjusted in order to achieve new illuminance settings which the luminaire controller determined based on the received factor β. Various methods such as e.g. proportional/integral/derivative and combinations thereof are known in controls literature to achieve the illuminance settings (e.g. the set-point) based on feedback from light sensor measurements.

Below, results of simulations for various light management approaches are discussed. Three exemplary cases for achieving power reduction have been considered.

In a first, simplest, case, each luminaire controller applies a factor α to its current light sensor set-point to obtain a new set-point. Thus, in this case, occupancy status information is not provided from the luminaire to the local coordinator, and the local coordinator simply passes the value of factor α to the luminaire controller.

In a second case, each luminaire controller feeds back to its' local coordinator the local occupancy status as determined by the occupancy sensor of the respective luminaire as well as the current dim level values. The local coordinator then computes a factor β to apply at only the luminaires with local unoccupancy, where $$\beta = \alpha - \frac{(1-\alpha)\sum_{j \in occ} d_j}{\sum_{k \in unocc} d_k},$$

where $d_j$ is a dimming level of a luminaire j which is in occupied state within the local coordination of local coordinator, $d_k$ is a dimming level of a luminaire k which is in unoccupied state. Clearly, β<α, so luminaires reporting unoccupancy will apply a lower set-point and will be dimmed more aggressively. In a variant of this embodiment, the local coordinator further has knowledge about luminaire neighborhood. In the example shown, the local controller knows that the neighbors of luminaire 1 are indexed 2, 7 and 8, the neighbors of luminaire 9 are indexed 2, 3, 4, 8, 9, 10, 14, 15 and 16, and so on. The local coordinator thus applies a different factor (lower) in unoccupied zones that are in proximity of an occupied zone than is further away from an occupied zone. This ensures that the illuminance levels in and immediately around occupied zones are not adversely affected by too much.

In a third case, the set-points of individual luminaire controllers are adapted in steps based on the status information provided to the local coordinator until a power reduction of α is achieved at the local coordinator. Thus, the luminaires and the local coordinator form a closed-loop control system. Specifically, at each step k, new set-points for occupied and unoccupied luminaires are determined as follows:

Occupied: set-point$^{occ}$=$\beta_k^{occ}$ set-point$^{occ}$
Unoccupied: set-point$^{unocc}$=$\beta_k^{unocc}$ set-point$^{unocc}$,
where $\beta_k^{occ}$ and $\beta_k^{unocc}$ are the beta values applied at step k for occupied and unoccupied steps respectively.

In addition, the luminaires may indicate to the local coordinator if they have reached saturation, i.e. their dimming level is either at the minimum or maximum permissible and they can no longer engage in power reduction.

Figure 6:
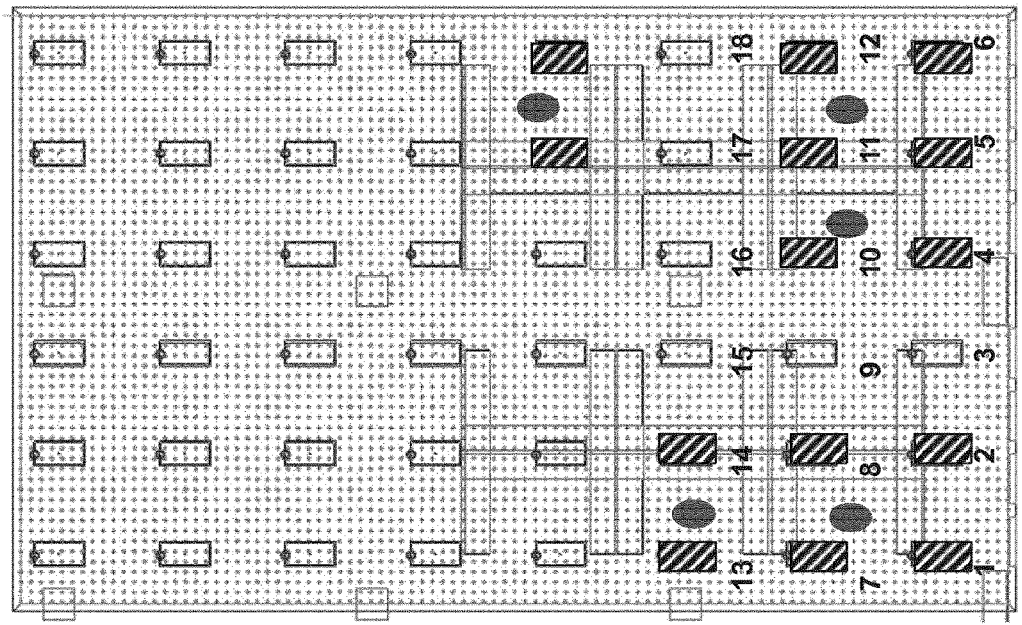
FIG. 6 illustrates an exemplary occupancy scenario in an exemplary lighting system with 48 luminaires used in the simulations illustrated in FIGS. 7A-B, 8A-B, and 9A-B, according to one embodiment of the present invention.

For these three cases, a lighting system with 48 luminaires was simulated, and an example occupancy scenario as depicted in FIG. 6, with no daylight. The requested power reduction factor α was equal to 0.7. For the second case, β was equal to 0.1782. For the third case, close-loop control was executed using the following algorithm:

Calculate
Delta=α−(current power)/(requested power)
If Delta<0
Occupied regions by factor $\beta_k^{occ}$=0.99
Unoccupied regions by factor $\beta_k^{unocc}$=0.95
Else if Delta>0.1
Occupied regions by factor $\beta_k^{occ}$=1.1
Unoccupied regions by factor $\beta_r^{unocc}$=1.01

Figure 7A:
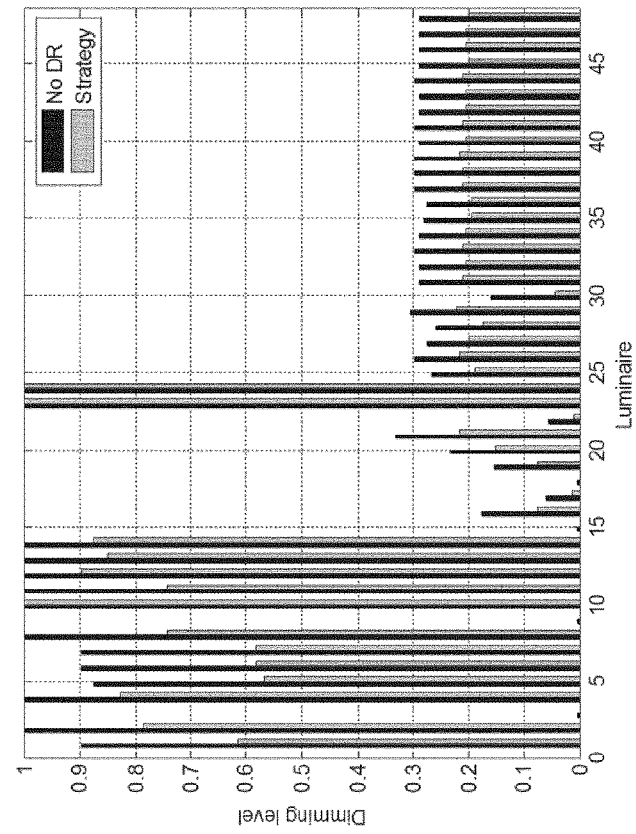
FIGS. 7A, 8A, and 9A illustrate the average illuminance levels achieved at the workspace over the 12 zones of FIG. 6 for the first, second, and third simulated cases, respectively.
Figure 7B:
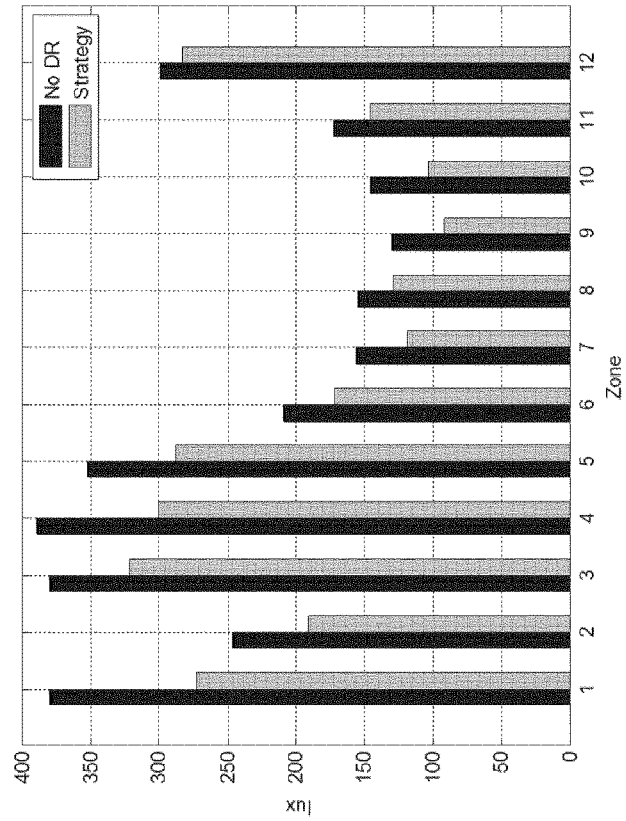
FIGS. 7B, 8B, and 9B illustrate the dimming levels of the 48 luminaires for the first, second, and third simulated cases, respectively.
Figure 8B:
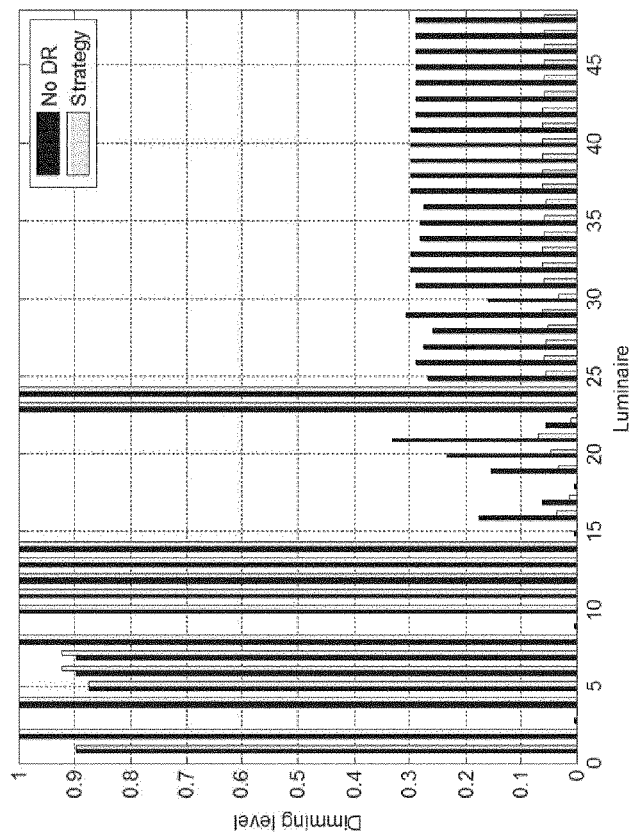
Figure 8A:
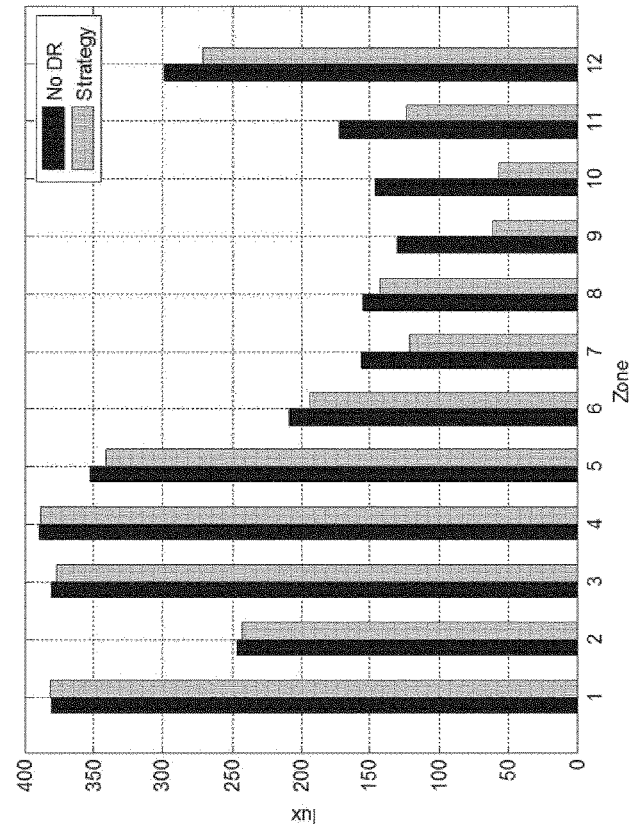
Figure 9A:
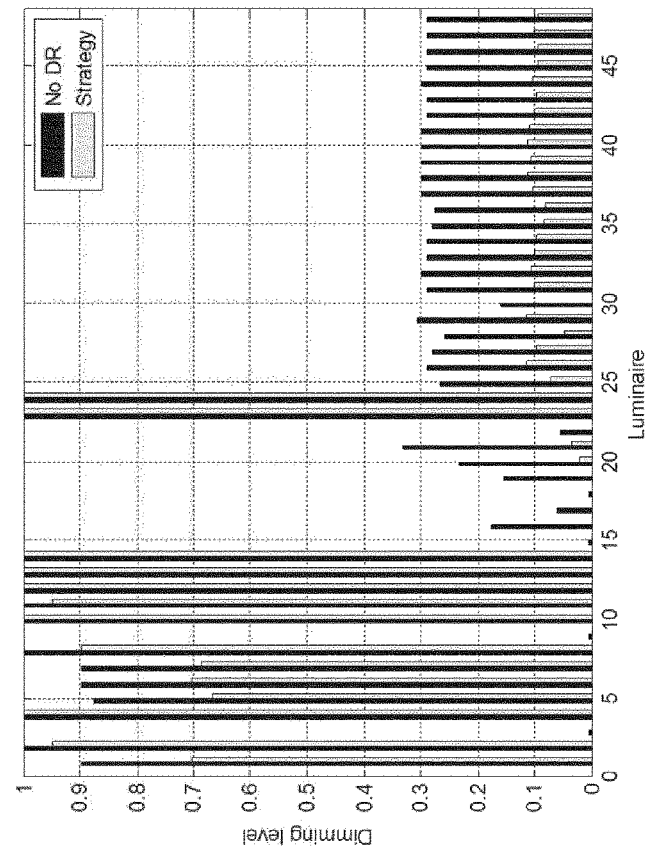
Figure 9B:
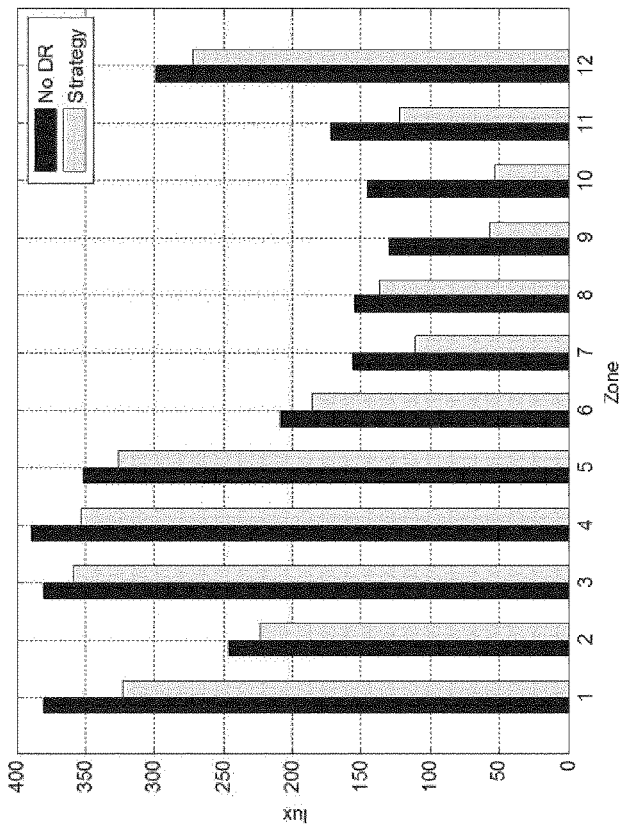

FIGS. 7A, 8A, and 9A illustrate the average illuminance levels achieved at the workspace over the 12 zones, while FIGS. 7B, 8B, and 9B illustrate the dimming levels at the 48 luminaires for the first, second, and third cases, respectively. As can be seen from these Figures, in the first case, about 24% power reduction is achieved as opposed to the requested 30%. This is because some of the luminaires are already in saturation and do not react to the change in set-point request. As such, the anticipated power reduction under the first case approach may be lower than requested. Under the approaches for the second and third cases, about 32% and 30.8% power reduction is achieved, respectively. This illustrates that the approach of the third case provides a more accurate power reduction due to the close-loop control.

Various embodiments may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Thus, elements and aspects discussed for or in relation with a particular embodiment may be suitably combined with elements and aspects of other embodiments, unless explicitly stated otherwise. The scope of the present invention is determined by the claims that follow.

The invention claimed is:

1. A method for a luminaire communicatively connected to a local coordinator to manage light settings of the luminaire, wherein the luminaire comprises memory and one or more processors, the method being implemented by the local coordinator, and by program code accessed from the memory and executed on the one or more processors of the luminaire; the method comprising:
   providing, from the luminaire to the local coordinator, a control state of the luminaire, the control state comprising an occupancy status based on occupancy information sensed by an occupancy sensor of the luminaire;
   at the coordinator, determining a power reduction factor for the luminaire indicating by how much power consumption of the luminaire is requested to be reduced, wherein the determination of the power reduction factor is based on the occupancy status provided to the local coordinator by the luminaire and on occupancy statuses provided to the local coordinator by the one or more additional luminaires;
   receiving, at the luminaire from the local coordinator, the power reduction factor for the luminaire;
   determining, at the luminaire, new illuminance settings for the luminaire by applying the received power reduction factor to current illuminance settings for the luminaire, wherein the illuminance settings comprise a target value for illuminance to be achieved within an illuminated space, the illuminated space comprising a sensing region of a light sensor of the luminaire;
   providing an instruction to measure, at the luminaire, luminance within the sensing region of the light sensor of the luminaire while one or more light sources of the luminaire emit light according to one or more operating parameters, wherein the measured luminance comprises contribution from the light emitted by the one or more light sources of the luminaire and contribution from light emitted by light sources other than the one or more light sources of the luminaire;
   based on the measured luminance at the luminaire, adjusting the one or more operating parameters to achieve the new illuminance settings.

2. The method according to claim 1, further comprising providing, from the luminaire to the local coordinator, the one or more operating parameters associated with the current illuminance settings for the luminaire, wherein the power reduction factor is further based on the one or more operating parameters provided to the local coordinator by the luminaire and on one or more operating parameters provided to the local coordinator by the one or more additional luminaires.

3. The method according to claim 1, wherein the one or more operating parameters comprise a dimming level, a color temperature, and/or an illumination profile for the one or more light sources of the luminaire.

4. The method according to claim 1, wherein the occupancy status of the luminaire comprises one of a plurality of predefined states, the predefined states comprising a luminaire-occupied state, an area-occupied state, and an unoccupied state.

5. A computer program product comprising software code portions stored on computer-readable memory and configured for, when executed on the coordinator and the one or more processors of the luminaire, performing the steps of the method according to claim 1.

6. The method according to claim 1, wherein the illuminance settings further comprise target values for one or more of dimming level, color rendering index, correlated color temperature, color quality scale (CQS), Gamut Area Index (GAI), Gamut Area Scale (GAS), Color Harmony Rendering Index (HRI), and Delta-uv (Duv).

7. The method according to claim 1, further comprising providing the adjusted one or more operating parameters to the local coordinator.

8. A system comprising:
   a plurality of luminaires, each comprising memory and one or more processors; and
   a local coordinator communicatively connected to the plurality of the luminaires;
   wherein each of the luminaires is configured to, by executing program code accessed from the memory on the one or more processors of the luminaire, provide a control state of the luminaire from the luminaire to the local coordinator, the control state comprising an occupancy status based on occupancy information sensed by an occupancy sensor of the luminaire;
   wherein the local coordinator is configured
   to receive the control state from each luminaire of the plurality of luminaires, and to determine
   a power reduction factor ($\beta_i$) for the each luminaire and to provide the determined power reduction factor to each respective luminaire, the power reduction factor for the each luminaire indicating y how much power consumption of the luminaire is requested to be reduced, and the power reduction factor for the each luminaire being based on the occupancy statuses received from the plurality of luminaires; and
   wherein each of the luminaires is further configured to, by executing program code accessed from the memory on the one or more processors of the luminaire;
   receive, at the luminaire from the local coordinator, the power reduction factor for the luminaire;
   determine, at the luminaire, new illuminance settings for the luminaire by applying the received power reduction factor to current illuminance settings for the luminaire, wherein the illuminance settings comprise a target value for illuminance to be achieved within an illuminated space, the illuminated space comprising a sensing region of a light sensor of the luminaire;
   provide an instruction to measure, at the luminaire, luminance within the sensing region of the light sensor of the luminaire while one or more light sources of the luminaire emit light according to one or more operating parameters, wherein the measured luminance comprises contribution from the light emitted by the one or more light sources of the luminaire and contribution from light emitted by light sources other than the one or more light sources of the luminaire;
   based on the measured luminance at the luminaire, adjust the one or more operating parameters to achieve the new illuminance settings.

9. The system of claim 8, wherein each of the luminaires is further configured to, by executing program code accessed from the memory on the one or more processors of the luminaire:
   provide, from the luminaire to the local coordinator, the one or more operating parameters associated with the current illuminance settings for the luminaire, wherein the power reduction factor is further based on the one or more operating parameters provided to the local coordinator by the luminaire and on one or more operating parameters provided to the local coordinator by the one or more additional luminaires.

10. The system of claim 8, wherein the occupancy status comprises one of a plurality of predefined states, the predefined states comprising: a luminaire-occupied state, an area-occupied state, and an unoccupied state.

11. The system of claim 8, wherein each of the luminaires is further configured to, by executing program code accessed from the memory on the one or more processors of the luminaire:

provide the adjusted one or more operating parameters to the local coordinator.

12. The system according to claim 11, wherein the local coordinator is configured for determining the power reduction factor ($\beta_i$) for the each luminaire further based on one or more operating parameters associated with the current illuminance settings for the each luminaire of the plurality of luminaires.

13. The system according to claim 8, wherein the local coordinator is further configured for receiving a group power reduction factor ($\alpha$) and wherein the local coordinator is configured for determining the power reduction factor ($\beta_i$) for the each luminaire further based on the received group power reduction factor ($\alpha$).

14. The system according to claim 13, wherein the one or more operating parameters of the each luminaire of the plurality of luminaires are adjusted in steps until the group power reduction factor ($\alpha$) is achieved.

15. The system according to claim 13, further comprising a central coordinator communicatively connected to the local coordinator and to at least one additional local coordinator and configured for providing the group power reduction factor ($\alpha$) to the local coordinator and the at least one additional local coordinator.

* * * * *